May 15, 1928.
F. W. BERNAU
1,670,018
AUTOMATIC CARRIAGE RETURN MECHANISM
Filed Oct. 16, 1926     5 Sheets-Sheet 1
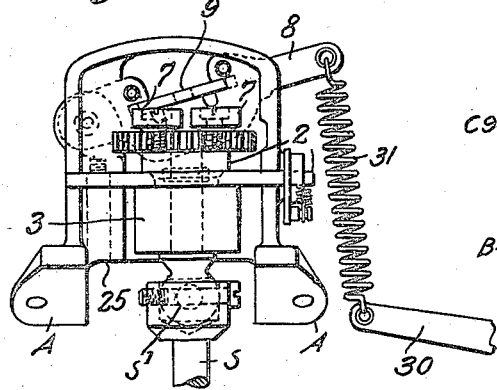
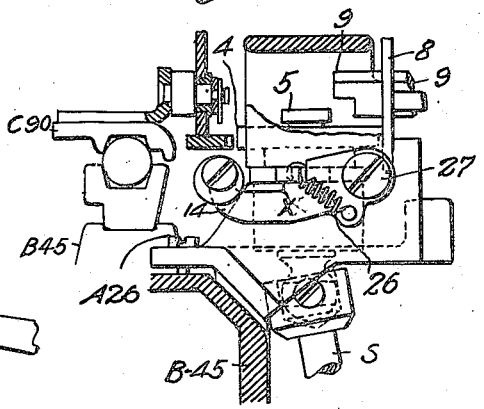
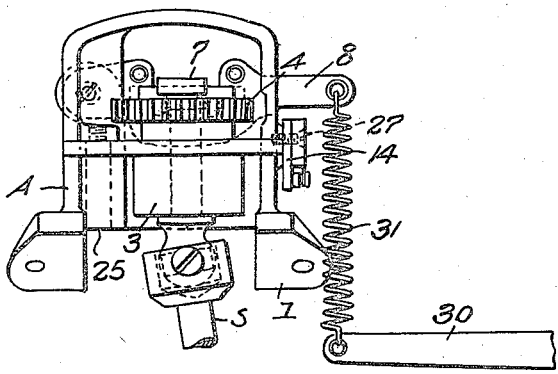
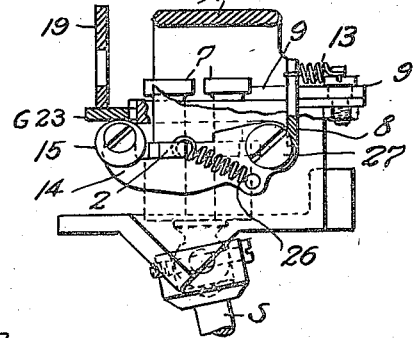
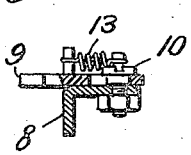
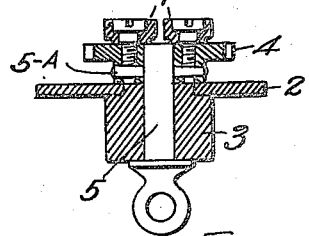
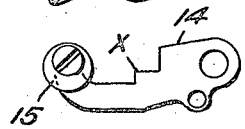
Inventor:
Frederick W. Bernau
By (signature) Atty.

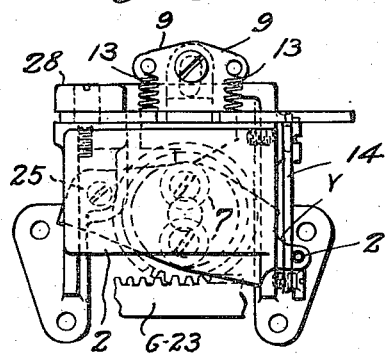
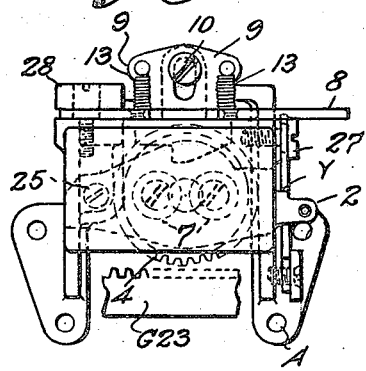
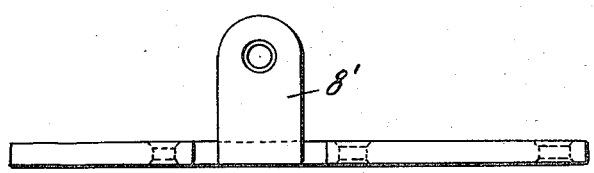
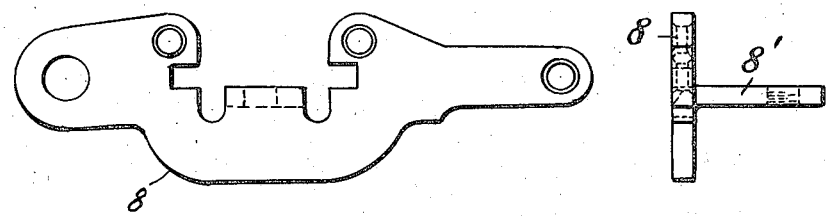

May. 15, 1928.
F. W. BERNAU
AUTOMATIC CARRIAGE RETURN MECHANISM
Filed Oct. 16, 1926 5 Sheets-Sheet 3
1,670,018
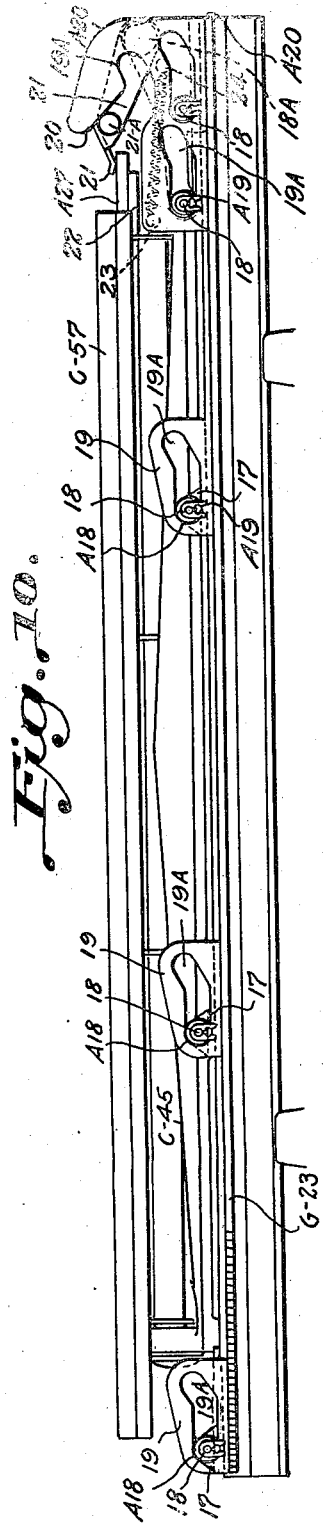
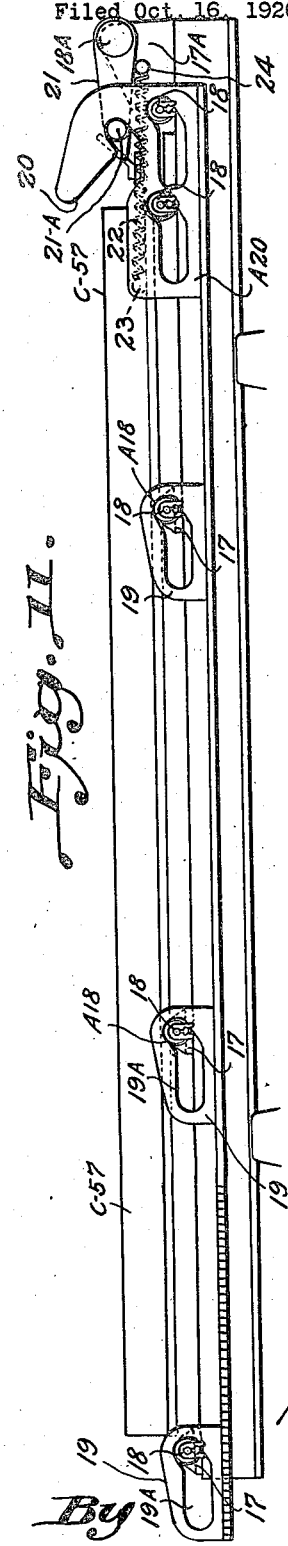
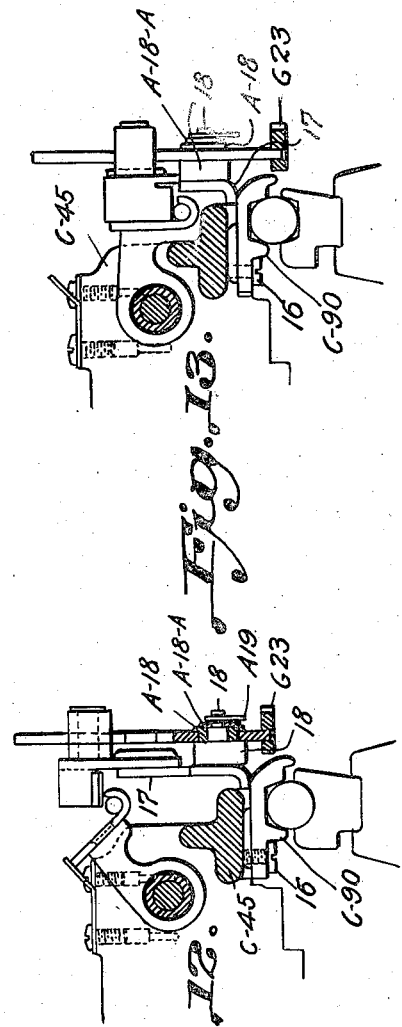
Inventor,
Frederick W Bernau
By
Attys.

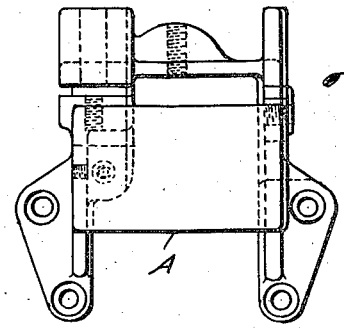
Fig. 14.
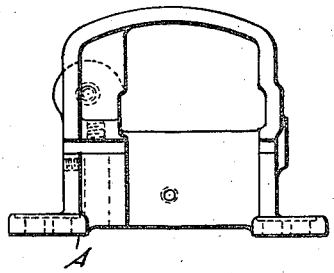
Fig. 14ᴬ.
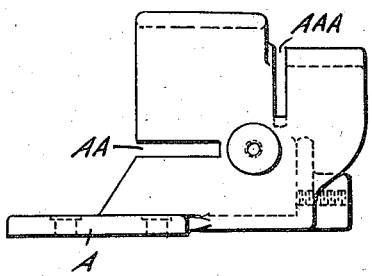
Fig. 14ᴮ.
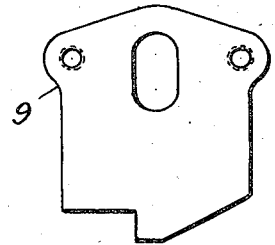
Fig. 17.
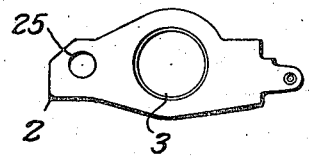
Fig. 15.
Inventor,
Frederick W. Bernau
By G. M. Hamlin
Atty.

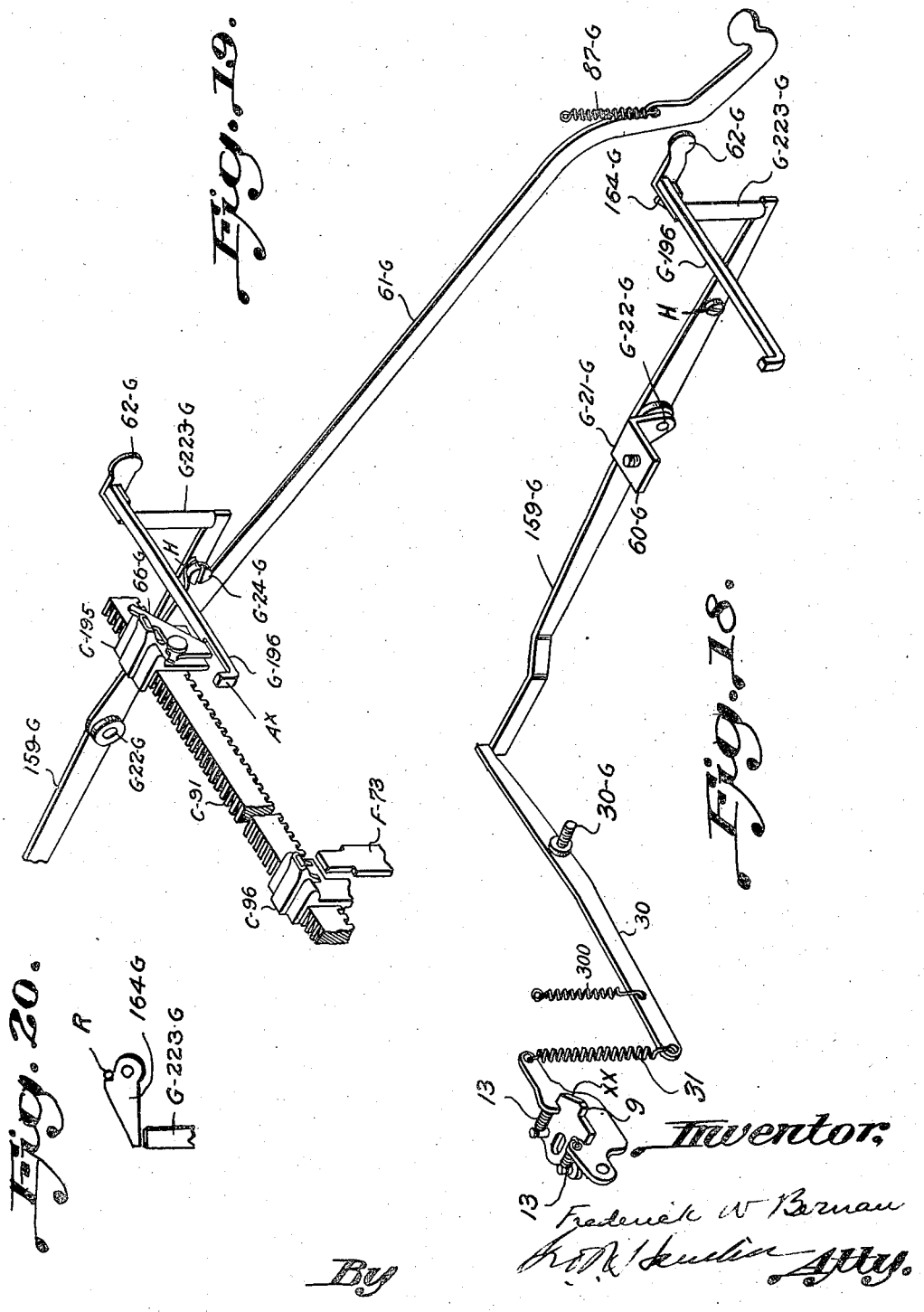

Patented May 15, 1928.

1,670,018

UNITED STATES PATENT OFFICE.

FREDERICK W. BERNAU, OF HILLSIDE, NEW JERSEY, ASSIGNOR TO ELLIS ADDING TYPEWRITER COMPANY, OF NEWARK, NEW JERSEY, A CORPORATION OF NEW JERSEY.

AUTOMATIC CARRIAGE-RETURN MECHANISM.

Application filed October 16, 1926. Serial No. 142,002.

This invention relates to that general class of mechanisms which have for their purpose the automatic return to starting position of the traveling carriage of a typewriter or calculating machine when it reaches the end of its travel, so that it may again be in position for the starting of another line.

The object of the invention is the provision of improved mechanisms for automatically effecting the return to starting position of the carriage of a typewriter or calculating machine after the carriage has reached its pre-determined point of travel on the completion of a line and to automatically turn the platen to line-space the paper when returning the carriage to starting position.

My improvements, while more particularly intended to effect automatic return of the carriage by the utilization of power, for instance an electric motor drive, when the end of the line is reached, also embody manually operable means by which the operator may, when desired, cause the clutching mechanism and feeding mechanism to become operative so that the carriage may be caused to automatically return to starting position whenever desired, even though the line has not at that time been completed.

The present invention has been devised more particularly for use in connection with the well-known "Ellis" calculating machine or combined calculating and typewriting machine and it is hereinafter described in connection therewith and reference is made to prior "Ellis" patents, for instance No. 1,197,276 dated September 5, 1916, as illustrating a machine to which the improvements are adapted.

I wish it to be understood, however, that the invention is not restricted to use in connection with the "Ellis" machine as it may be used in connection with any calculating machine or typewriter.

In the accompanying drawings:

Figure 1, is a rear elevation of the clutching and feeding mechanism, the parts being in normal position;

Fig. 2, is a vertical section therethrough, showing how this mechanism is related to the carriage and the frame of the machine, certain parts being in full lines, and the mechanism being in normal position;

Fig. 3, is a view like Fig. 1, the trip cam being in position for use;

Fig. 4, is a view like Fig. 2, the trip cam being in position for use;

Fig. 5, is a plan view of the clutching and feeding mechanism, in normal position;

Fig. 6, is a view like Fig. 5 but showing the trip cam in position for use;

Fig. 7, is a detail section showing the driving spindle, the pinion or gear, and the rollers;

Fig. 8, is a detail section through the trip cam;

Fig. 9, is a detail view of the trip latch;

Fig. 10, is a rear elevation of the carriage return rack, and affiliated means, shown in normal position;

Fig. 11, is a similar view, the parts being in operated position;

Fig. 12, is an end elevation, partly in section, of the means shown in Fig. 10 when in normal position;

Fig. 13, is a similar view of the means shown in Fig. 11 when in operated position;

Figs. 14, 14$^A$, 14$^B$, are views of the housing for the clutch mechanism, including the trip latch and trip cam;

Fig. 15, is a detail view of a certain cam plate;

Fig. 16, comprises plan and side views of a part of the trip cam;

Fig. 17, is a detail view of another part of the trip cam;

Fig. 18, is a detached detail perspective view of certain lever controls showing their co-operation with the trip cam;

Fig. 19, is a detail perspective of certain manual controlling levers showing how they are used with a trip on the carriage and in connection with the mechanism of Fig. 18; and Fig. 20, is a detail view of certain parts of the mechanisms of Figs. 18 and 19.

No illustration is given of the electric motor drive of the machine, but it will be understood that the parts of the present invention which constitute the clutch, pinion, etc., are operated by a shaft S, Figs. 1, 2, 3, 4, which has a universal joint connection S1 with the shaft 5 which carries the pinion 4 that is adapted to engage with the rack G23 for purposes of return of the carriage. The shaft S of this type of drive may have a telescopic universal joint connection with the electric drive so that said shaft may swing and yet be in rotation so that power may be derived therefrom.

The case of the "Ellis" machine is shown at B45 and the carriage appears at C90.

The stop bar which is carried by the carriage at the front thereof in the "Ellis" machine appears at C91 and corresponds to a similarly numbered bar appearing in Fig. 56 of the patent to Ellis No. 1,197,276 September 5, 1916.

The carriage may be arrested in any tabulated position by the plunger F73 co-operating with stops C96 and C195 in a manner which will be well understood by reference to Patent 1,197,276.

As my present improvements only relate to the return of the carriage either automatically or under manual control and to spacing of the platen so that another line will be presented for use when the carriage has been returned to starting position, it is deemed unnecessary to illustrate other parts of the "Ellis" machine or to make reference thereto other than as set forth hereinafter.

The parts of the automatic control are carried by a housing A which appears alone in detail in Fig. 14 and is shown in Figs. 1 to 6 in connection with the mechanisms. There is shown in detail in Fig. 15 a cam plate 2 which is pivoted at 25 and is adapted to slide horizontally in a slot AA. The plate has a bearing 3 for a shaft 5, said shaft 5 being coupled by the universal joint S1 to the drive shaft S, as previously explained.

The shaft 5 has keyed thereto by a pin 5A, the return gear or pinion 4. When this gear or pinion is moved by the swinging of the cam plate 2 to bring it into mesh with the rack G23, as hereinafter explained, the carriage is returned to starting position. Normally, the pinion is out of mesh with the rack G23 as shown in Fig. 6.

The pinion 4 carries two rollers 7 arranged diametrically on suitable studs.

To swing the cam plate 2 for the purpose of causing the pinion 4 to engage the rack G23, there are provided certain means now to be described.

Referring to Figs. 8, 16, and 17, there is a trip cam comprising the parts 8 and 9. The part 8 is pivoted at one end by a screw 28 which is entered in the housing A. Said plate 8 is slidable vertically in a slot AAA in the housing A and it may be moved downwardly by a lever 30, Figs. 1, 3, and 18 either under manual control or under carriage control. The lever 30 is pivoted to the frame B45 at 30G.

The other member of the trip cam which is shown at 9 in Fig. 17, is slidable horizontally in slots provided in the part 8 but is bodily movable up and down with said part 8 so that the two move as a unit. This trip cam member 9 has a pin and slot loose connection 10 with a horizontally extending part, Fig. 16, of the piece 8. Springs 13 connect the piece 9 with the piece 8 to hold the piece 9 projected as shown in Figs. 6, 8, and 18 but the piece 9 can yield.

Normally, the lever 30 is held in raised position, Fig. 18, by a spring 300 which, being stronger than the spring 31 connecting the piece 8 to the lever 30, holds the trip cam 8, 9 in raised position shown in Fig. 1. Consequently, the rotation of the shaft 5 by the shaft S and the turning of the pinion 4 does not normally result in any engagement of the pinion 4 with the rack G23.

When the trip cam 8, 9, is pulled downwardly by operating the lever 30 either manually or automatically, the pinion is forced into engagement with the rack G23 by the wiping of the rollers 7 against the cam surface XX of the piece 9.

Referring to Figs. 2, 4, and 9, there is a trip latch 14 which is pivoted at 27 to the housing A. This latch carries at its free end an eccentric 15 which can be set to provide proper adjustment. The trip latch is connected by a spring 26 to the free end of the sliding latch 2, said spring tending to hold the trip latch 14 in an upward or raised position, while holding the pivoted cam plate 2 in a retracted position.

The trip latch 14 has a shoulder X, and the cam plate 2 has a shoulder Y, the purposes of which will appear hereinafter.

Secured to the rear of the carriage C90 are angle brackets 17, Figs. 10, 11, 12, 13. These brackets carry studs 18. A specially shaped bracket 17A, Fig. 11, is secured to the right-hand end of the carriage rail.

Secured to the rack G23 are guide cams 19 which have slots 19A provided with a horizontal part and an upwardly inclined part. There is an additional guide cam A20 at the right-hand end of the rack G23 which is provided with the cam slots 19A and also has an upward projection 20 serving a purpose which will hereinafter appear.

The bracket 17A carries a feed pawl 21 which is pivotally mounted at 18A. A feed roller 21A is carried by this pawl, and the pawl has a tip 20 which normally rests on top of the pin A27 that projects from the end of the bail rail C57.

Reference is to be had to Patent 1,197,276 for a full disclosure of the construction, mounting, and operation, of the bail rail C57.

Rollers A18 are carried by the studs 18 and located in the slots 19A, said rollers being adapted normally to lie as shown in Fig. 10 and to enter the inclined ends of the slots as shown in Fig. 11 when in operated position.

A spring 22 which is attached at 23 to the feed cam A20 and also connected at 24 to the angle bracket 18A, tends to hold the parts in the position shown in Fig. 10.

Referring to Figs. 18, 19 and 20, illustration is given of the means for causing operation of the carriage return mechanism either automatically by the action of the carriage when it reaches the end of the line, or, manually, at the will of the operator.

The lever 30 and its operation have been previously described. There is an intermediate lever 159G which is pivoted at G22G to a bracket 60G fastened to the case of the machine. The lever 159G has its end located under the end of the lever 30. A plunger G223G which is suitably positioned in the case of the machine, rests on the end of the lever 159G.

There is a laterally or horizontally slidable bar G196 which has a finger piece 62G extending through a slot in the case and conveniently positioned to be grasped by the operator, when he wishes to move the bar G196 to manually control the mechanism. The end of the bar G196 is turned upwardly at $A^x$ as shown in Fig. 20. One of the rivets used to fasten the finger piece 62G to the bar G196 projects as indicated at R to co-operate with a pivoted plunger dog 164G. The dog is utilized to depress the plunger G223G when the bar G196 is moved either automatically by the carriage or manually. Automatic control is effected by the marginal stop C195, Fig. 19. This stop has a latch 66G which may be set so that it will engage the projection $A^x$ to thereby shift the slide bar G196 when the carriage has completed the line. When this occurs, the plunger G223G depresses the end of the lever 159G and swings the lever 30G against the tension of the spring 300. This results in stretching the spring 31 and pulling down the trip cam 8, 9, from the position shown in Figs. 1 and 2 to that appearing in Figs. 3 and 4. The result of this operation is to bring the trip cam 9 into the same plane as the rollers 7. Consequently, the rotation of the pinion 4 causes the rollers 7 to abut the trip cam 9 and this action results in swinging the plate 2 and the pinion 4 laterally to cause the pinion 4 to engage the teeth of the rack G23, whereupon the continued rotation of the pinion 4 causes the carriage to be returned to starting position. If the automatic return is not desired, the stop or latch 66G will be arranged so that it will not engage the part $A^x$.

If it is desired to restore the carriage to starting position at the will of the operator, all that is necessary is to grasp the piece 62G and manually slide the bar G196, thus duplicating what is accomplished by the latch 66G.

As a convenient means for manually effecting restoration of the carriage to starting position, there is provided another lever 61G which is pivoted at G22G and is located for a part of its length alongside the lever 159G. The lever 61G is provided with a hook H which overhangs the shank of a screw G24G carried by the lever 159G. The key or finger piece of the lever 61G is preferably located in the typewriter keyboard of the "Ellis" machine but it may be disposed on the calculating machine keyboard if desired. A spring 87G normally holds the lever 61G in raised position.

On depressing the key of the lever 61G, the hook H pulls down on the screw G24G and operates the lever 159G in the manner previously described.

The housing A for the carriage return mechanism is secured to the case B45 by screws A26 as shown in Fig. 2.

Operation. Assuming that the shaft S is being rotated by the electric motor of the machine, when it is desired to have the carriage C90 return automatically or to be made to return at will, the automatic or manual action previously described operates the lever 30, pulling down the trip cam 8 which swings on its pivot 28. This brings the beveled or cam edge XX and the trip cam 9 in the path of rotation of the rollers 7. The pressure resulting causes the cam plate to swing on its pivot 25 and this brings the pinion 4 into mesh with the rack G23. The camming action of the rollers against the edge XX is the cause of this action. However, just prior to the time when the rollers 7 assume the position shown in Fig. 5, the cam plate 2 has moved sufficiently to permit the shoulder X on the trip latch 14 to engage behind the shoulder Y on the said plate 2. When the plate 2 is latched by the trip latch 14 in this fashion, as shown in Figs. 4 and 5, the teeth of the pinion 4 are fully meshed with the teeth of the return rack G23. The rotation of the pinion 4 then causes the rack G23 to travel and hence to return the carriage C90 back to its starting point, thus automatically effecting a carriage return movement.

Just prior to starting the return movement of the carriage, the rack G23 will first advance slightly, this being permitted by the slots 19A. The result is that the feed cam 20, Figs. 10 and 11 depresses the roll 21A of the feed pawl 21, swinging said pawl on its pivot 18A, thereby taking up any lost motion which might exist in the line-space or platen turning mechanism of the "Ellis" machine. When this action has occurred, the continuance of the rotation of the pinion 4 causes the carriage C90 to travel toward its starting point and to continue until arrested by the marginal stop as will appear from earlier "Ellis" patents.

When the carriage has been arrested, the pinion 4 is still intermeshed with the rack G23. Inasmuch as this condition prevails, the rack G23 is forced to move from the position shown in Fig. 10 to the position shown in Fig. 11. This results in the pawl 21 being forced downwardly and by its engagement with the piece 22, to depress the bail rail C57 and cause an operation of the line-space or platen turning mechanism, whose construction and operation are fully set forth in the patent to "Ellis" No. 1,197,276. Thus, not only is the carriage returned to starting position, but the present mechanism also effects a turning of the platen to space the paper thereon for the printing of another line.

Immediately after the bail rail C57 has been moved far enough to cause the platen to feed the paper, that is, just prior to the time when the roller A18 reaches the top of the cam shaped slot 19A, the underside of the rack G23 causes the shoulder X on the trip latch 14 to free itself from the shoulder Y on the cam plate 2. This action results in the plate 2 being free to be retracted by the spring 26 to its normal position as shown in Fig. 6. Consequently, the pinion 4 is disconnected from the rack G23.

The purpose of the springs 13 is to provide a safety release in the event that the pinion 4 tends to become locked with the rack G23. The springs are sufficiently strong to hold the cam plate 9 in a substantially stationary position when lowered to the position shown in Fig. 5 to serve as a camming abutment but there is a yielding or safety action permitted to prevent interlocking as between the pinion 4 and the rack G23.

What I claim is:

1. In a carriage return mechanism for calculating machines and typewriters, the combination with the paper feed mechanism, and the carriage of the machine, of a return rack movably mounted on, and shiftable with, said carriage, means operated by the movement of said rack in relation to the carriage which causes operation of the paper feed mechanism, a return pinion normally disengaged from said rack, and means operated by the carriage for causing said pinion to engage the rack for the purpose of automatically returning the carriage, and means for automatically dis-engaging the pinion from the carriage after the carriage has been returned.

2. In a carriage return mechanism for calculating machines and typewriters, the combination with the paper feed mechanism, and the carriage of the machine, of a return rack movably mounted on, and shiftable with, said carriage, means operated by the movement of said rack in relation to the carriage which causes operation of the paper feed mechanism, a return pinion normally disengaged from said rack, means operated by the carriage for causing said pinion to engage the rack for the purpose of automatically returning the carriage, means for automatically dis-engaging the pinion from the carriage after the carriage has been returned, and manually operable means for causing said pinion to engage the rack for returning the carriage at the will of the operator.

3. In a carriage return mechanism for calculating machines and typewriters, the combination with the paper feed mechanism, and the carriage of the machine, of a return rack carried by said carriage and adapted for a shifting movement to operate the paper feed mechanism, a return pinion normally disengaged from said rack, means automatically operated by the carriage for causing said pinion to engage the rack for the purpose of automatically returning the carriage, and manually operable means for causing said pinion to engage the rack for returning the carriage at the will of the operator, said carriage-operated means and manually-operated means being combined to enable either control to be selected for use at the will of the operator.

4. In a carriage return mechanism for calculating machines and typewriters, the combination with a return rack carried by the carriage, of a movably mounted pinion which is normally disengaged from said rack, means for rotating said pinion, means for shifting the pinion into engagement with the rack, means carried by the carriage adapted to automatically operate said pinion-shifting means each time the carriage arrives at its pre-determined stopping point, means for holding the pinion in engagement with the rack when it has been made to mesh therewith until the carriage has been returned to its starting point, and means then automatically acting to release the pinion from the rack.

5. In a carriage return mechanism for calculating machines and typewriters, the combination with a rack for the carriage, of a movably mounted pinion which is normally disengaged from said rack, means for rotating said pinion, and yielding safety means for shifting the pinion into engagement with the rack comprising a spring-cushioned slidable trip-cam and means for shifting said trip-cam into and out of position to exert a camming action on the pinion.

6. In a carriage return mechanism for calculating machines and typewriters, the combination with a rack for the carriage, of a movably mounted pinion which is normally disengaged from said rack, means for rotating said pinion, and yielding safety means for shifting the pinion into engagement with the rack comprising rolls on the pinion, a spring-cushioned slidable trip-cam, a trip-cam-carrier, and means for shifting said trip-cam-carrier to position the trip-cam where it will exert a camming action on the rolls.

7. In a carriage return mechanism for calculating machines and typewriters, the combination with a return rack carried by the carriage, of a movably mounted pinion which is normally dis-engaged from said rack, means for rotating said pinion, a shiftable camming device adapted, when operated, to "cam" said pinion into mesh with the rack, means carried by the carriage adapted to automatically operate said pinion-shifting means each time the carriage arrives at its pre-determined stopping point, means for holding the said pinion in engagement with the rack when it has been made to mesh therewith until the carriage has been returned to its starting point, and means then automatically acting to release the pinion from the rack.

8. In a carriage return mechanism for calculating machines and typewriters, the combination with a return rack carried by the carriage, of a movably mounted pinion which is normally dis-engaged from said rack, means for rotating said pinion, normally inactive yielding safety means adapted for shifting the pinion into engagement with the rack when said safety means is brought into operative position, a latch to hold said pinion in engagement with the rack until the carriage has been returned to its starting point and automatically acting means for releasing the pinion from the rack when the carriage has been returned.

9. In an automatic carriage return mechanism for calculating machines and typewriters, the combination with paper feed mechanism, and the carriage of the machine, of a carriage return rack mounted on, and shiftable with, said carriage, means operated by the movement of said rack in relation to the carriage which causes operation of the aforesaid paper feed mechanism, and means for feeding the rack, thereby to return the carriage.

10. In an automatic carriage return mechanism for calculating machines and typewriters, the combination with the carriage of the machine, of a return rack carried by said carriage, a constantly driven return pinion normally disengaged from the rack, pinion-shifting means on the machine adapted, when operated, to shift the pinion to cause it to engage with said rack, and means carried by said carriage adapted to automatically operate said pinion-shifting means each time the carriage arrives at its pre-determined stopping point.

11. In an automatic carriage return mechanism for calculating machines and typewriters, the combination with the carriage of the machine, of a return rack carried by said carriage, a constantly driven return pinion normally disengaged from the rack, pinion-shifting means on the machine adapted, when operated, to shift the pinion to cause it to engage with said rack, a stop carried by said carriage and arranged to be set in operative or inoperative position, said stop when set in operative position being adapted to automatically operate said pinion-shifting means each time the carriage arrives at its pre-determined stopping point.

12. In an automatic carriage return mechanism for calculating machines and typewriters, the combination with the carriage of the machine, of a return rack carried by said carriage, a constantly driven return pinion normally disengaged from the rack, pinion-shifting means on the machine adapted, when operated, to shift the pinion to cause it to engage with said rack, means carried by said carriage adapted to automatically operate said pinion-shifting means each time the carriage arrives at its pre-determined stopping point, and manually operable permissive means also adapted to shift said pinion-operating means to cause the pinion to engage the rack at any point of the travel of the carriage.

13. In an automatic carriage return mechanism for calculating machines and typewriters, the combination with the carriage of the machine, of a return rack carried by said carriage, a constantly driven return pinion normally disengaged from the rack, pinion-shifting means on the machine adapted, when operated, to shift the pinion to cause it to engage with said rack, means carried by said carriage adapted to automatically operate said pinion-shifting means each time the carriage arrives at its pre-determined stopping point, and means for automatically returning the pinion-shifting means to normal position, thereby to disengage the pinion from the rack when the carriage is returned to its starting position.

14. In an automatic carriage return mechanism for calculating machines and typewriters, the combination with the carriage of the machine, of a return rack carried by said carriage, a constantly driven return pinion normally disengaged from the rack, pinion-shifting means on the machine adapted, when operated, to shift the pinion to cause it to engage with said rack, means carried by said carriage adapted to automatically operate said pinion-shifting means each time the carriage arrives at its pre-determined stopping point, manually operable permissive means also adapted to shift said pinion-operating means to cause the pinion to engage the rack at any point of the travel of the carriage, and means for automatically effecting return of the pinion-shifting means to normal position thereby to disengage the pinion from the rack when the carriage is returned to its starting position.

In testimony whereof I affix my signature.

FREDERICK W. BERNAU.